United States Patent
Ray

(10) Patent No.: US 8,483,301 B2
(45) Date of Patent: Jul. 9, 2013

(54) MULTITONE SIGNAL SYNCHRONIZATION

(75) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 31 days.

(21) Appl. No.: 13/045,021

(22) Filed: Mar. 10, 2011

(65) Prior Publication Data

US 2012/0230456 A1    Sep. 13, 2012

(51) Int. Cl.
*H04K 1/10* (2006.01)
(52) U.S. Cl.
USPC ........... 375/260; 375/262; 375/265; 375/267; 375/340; 375/343; 375/346; 375/347
(58) Field of Classification Search
USPC .................. 375/260, 267, 262, 265, 340, 343, 375/346, 347; 370/203, 204, 205, 208, 209, 370/210
See application file for complete search history.

(56) References Cited

U.S. PATENT DOCUMENTS

| | | | |
|---|---|---|---|
| 6,487,252 B1 | 11/2002 | Kleider | |
| 7,372,400 B2 | 5/2008 | Cohen et al. | |
| 7,468,696 B2 | 12/2008 | Bornholdt | |
| 7,489,926 B2 | 2/2009 | Whelan et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,653,156 B2 | 1/2010 | Ray et al. | |
| 7,688,261 B2 | 3/2010 | DiEsposti | |
| 8,077,676 B2 * | 12/2011 | Chang | 370/332 |
| 8,165,009 B2 * | 4/2012 | Wu et al. | 370/208 |
| 8,165,249 B2 * | 4/2012 | Li et al. | 375/344 |
| 8,199,845 B2 * | 6/2012 | Yu et al. | 375/267 |
| 2005/0159891 A1 | 7/2005 | Cohen et al. | |
| 2008/0059059 A1 | 3/2008 | Cohen et al. | |
| 2008/0143605 A1 | 6/2008 | Bornholdt | |
| 2008/0146246 A1 | 6/2008 | Bornholdt | |
| 2009/0174597 A1 | 7/2009 | DiLellio et al. | |
| 2009/0228210 A1 | 9/2009 | Gutt | |
| 2009/0315764 A1 | 12/2009 | Cohen et al. | |
| 2009/0315769 A1 | 12/2009 | Whelan et al. | |
| 2011/0064153 A1 * | 3/2011 | Khan | 375/260 |
| 2012/0155648 A1 * | 6/2012 | Tupala | 380/287 |

OTHER PUBLICATIONS

Xin Li et al, Multifrequency-base Range Estimation of RFID Tages, RFID, 2009 IEEE International Conference, IEEE, Piscataway, NJ, USA, Apr. 27, 2009, pp. 147-154.
European Search Report, EP 12 15 9096, Jul. 12, 2012.

* cited by examiner

*Primary Examiner* — Dhaval Patel
(74) *Attorney, Agent, or Firm* — Caven & Aghevli LLC

(57) ABSTRACT

In one embodiment, a method to generate a set of tone frequencies within an operating frequency range for use in a timing acquisition process in a wireless communication system comprises selecting a system frequency resolution generating a set of frequency tones which are relatively prime integers with respect to the frequency resolution and within an operating frequency range of the wireless communication system. Other embodiments may be described.

12 Claims, 7 Drawing Sheets

MULTITONE SIGNAL SYNCHRONIZATION

RELATED APPLICATIONS

None

BACKGROUND

The subject matter described herein relates to electronic communication, and more particularly to remote timing synchronization techniques which may be used in wireless communication systems.

Timing acquisition and synchronization is an important element of modern electronic systems, such as Digital Communications Systems, Radar Systems, and Digital Signal Processing Systems. The subject of receiver synchronization is discussed in many books on digital communications (see, for example, Sklar, B, Digital Communications, 2nd Ed., Chapter 10, Prentice Hall, Upper Saddle River, N.J., 2001), and, entire books have been written on the subject of receiver synchronization within digital communications systems (Mengali, U, Synchronization Techniques for Digital Receivers, Springer, New York, N.Y., 1997; Meyr, H. et al, Synchronization in Digital Communications, John Wiley & Sons, Hoboken, N.J., 1990), all of the foregoing books being hereby incorporated by reference. In many applications, such as the extremely dense signal environment of a cellular phone system, the low signal-to-noise-ratio communications channel of a deep space probe, or the very narrowband system employed by a digital modem in most personal computers, efficient signal synchronization techniques are desired. The act of synchronization within a receiver essentially involves replicating the timing information contained in the transmitted signal within the receiver, so that the data information modulated or encoded within the transmitted signal can be extracted. Without first obtaining synchronization, data information cannot be extracted from the transmitted signal, and the communications link will fail. Hence, timing acquisition is one of the first processes that takes place when a communications link between a receiver and a transmitter is established.

One technique employed in the systems mentioned above is the use of PN sequences for timing acquisition and synchronization. Additionally, due to improved clocks and the omnipresence of GPS, accurate time references are available at receivers for use in timing acquisition. Thus, when sending a PN sequence to achieve timing acquisition for many different applications that also have access to GPS and/or improved clocks, the timing uncertainty of these systems has been reduced.

Some existing timing and synchronization solutions use a code division multiple access (CDMA) type signal within a specific frequency band as a timing signal. Receivers synchronize to this signal using correlation techniques against a template for this CDMA signal. This structure restricts the timing signal to occupy a contiguous frequency band, requires a large and fast correlation unit to determine where the peak correlation is, is not robust against frequency dependent propagation effects and interference, and may be corrupted by signal multipath interference.

Accordingly, techniques for remote timing synchronization which may be used in wireless communication systems may find utility.

BRIEF DESCRIPTION OF THE DRAWINGS

The detailed description is described with reference to the accompanying figures.

SUMMARY

Figure 1:
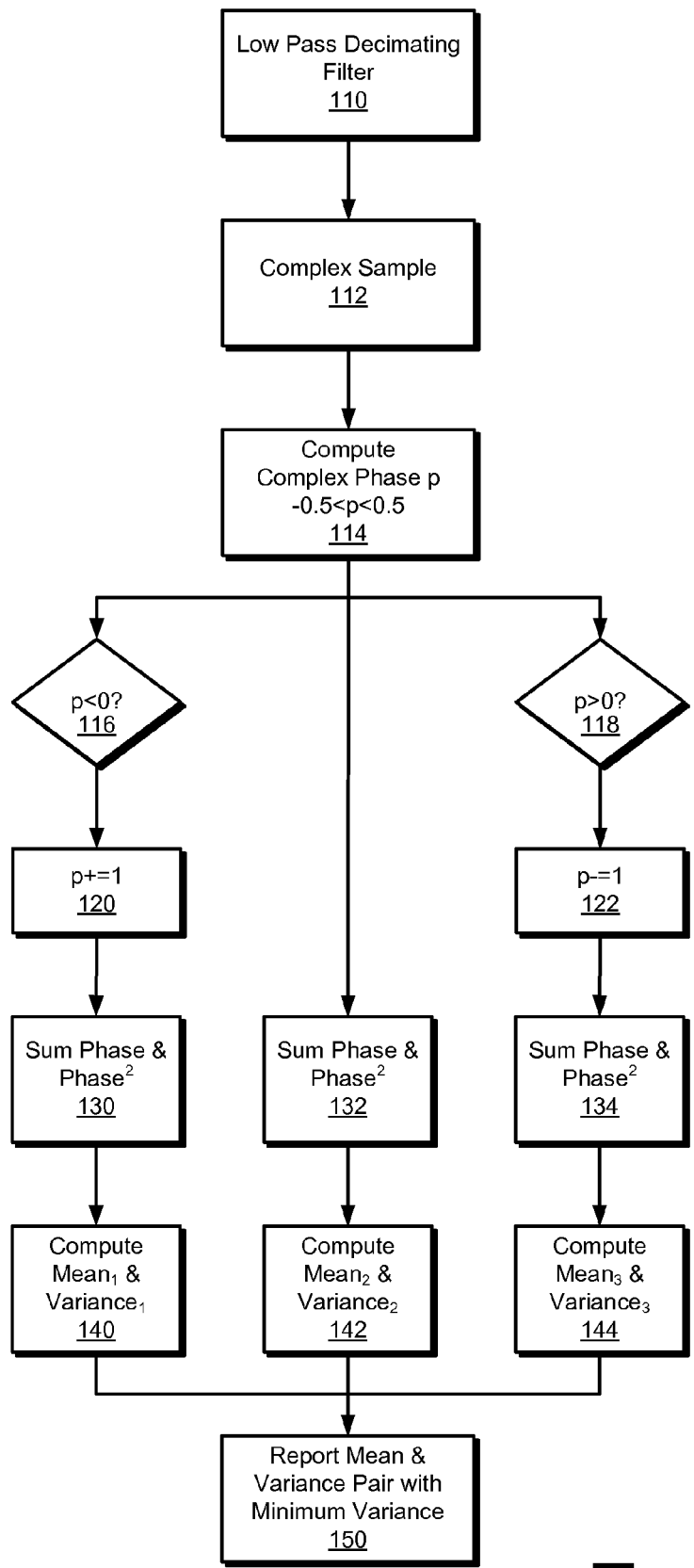
FIG. 1 is a flow diagram of an algorithm to determine a modulo mean and variance for phase measurements, according to embodiments.

Described herein are an apparatus, systems, and methods for remote timing synchronization techniques which may be used in wireless communication systems. In one or more embodiments a method to generate a set of tone frequencies within an operating frequency range for use in a timing acquisition process in a wireless communication system comprises selecting a system frequency resolution generating a set of frequency tones which are relatively prime integers with respect to the frequency resolution and within an operating frequency range of the wireless communication system.

In one or more embodiments, an apparatus to generate a set of tone frequencies within an operating frequency range for use in a timing acquisition process in a wireless communication system comprises a processor and a memory module comprising logic instructions which, when executed, configure the processor to select a system frequency resolution, and to generate a set of frequency tones which are relatively prime integers with respect to the frequency resolution and within an operating frequency range of the wireless communication system.

In one or more embodiments, a wireless communication system comprises a transmission node to generate and transmit a first subset of frequency tones and a receiver node to receive at least two signals comprising the first subset of frequency tones, compute a phase difference between the two signals, and use the phase difference to synchronize the transmitter and the receiver.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and elements have not been illustrated or described in detail so as not to obscure the particular embodiments.

This application describes and claims techniques for timing acquisition in wireless communication networks. Timing synchronization techniques described herein may be used to synchronize transmitters and receivers in the network.

Broadly, some embodiments of the timing acquisition process described herein involve generating one or more sets of frequency tones having predetermined characteristics in a transmitting station. At least a subset of the frequency tones are transmitted from the transmitting station. In a multipath environment multiple instances of the tones will be received at a receiving station. Logic in the receiving station may use phase differences between corresponding series of tones received at a receiving station to determine a timing delay, which in turn may be used to synchronize transmitters and receivers.

By using multiple tones, typically with amplitude below the noise floor, techniques described herein have features similar to CDMA in that the timing signal can reside within occupied signal bands without interfering with other signals. However, a system as described herein can use a wide variety of non-contiguous frequency ranges, may be implemented using simple decimating filters as computational elements, is robust against multipath interference since it can detect multipath on multiple tones, and can compensate for non-linear propagation effects.

By way of background, consider a complex signal model for a set of i=1, 2, ..., w transmitted tones $\{s_i\}$ as given $$s_i(t)=a_i\exp(2\pi j(f_i t+\theta_i)) \quad \text{Eq. 1}$$

where $a_i$ is the unknown amplitude, $f_i$ is the frequency in Hz, and $\theta_i$, $0.5<\theta_i<0.5$ is the phase. If D is an unknown time delay that all tones are subject to by way of propagation, then the received tones $\{S_i\}$ are of the form:

$$S_i(t-D)=a'_i\exp(2\pi j(f_i t+(\theta_i-f_i D))) \quad \text{Eq. 2}$$

or $$S_i(t-D)=a'_i\exp(2\pi j(f_i t+(\theta'_i))) \quad \text{Eq. 3}$$

where $\theta'_i=\theta_i-f_i D$. Unambiguous synchronization (or time delay measurement) for $|D|<1/(2f_i)$ then only requires a measurement of a phase difference of two signals (i.e., delayed versus undelayed) together with knowledge of the frequency of each tone. Similarly, if the time delay, typically caused by propagation, has a frequency dependent aspect so that each tone is delayed by a different amount from a known invertible non-linear process denoted by $g_i(D)$, then $\theta'_i=\theta_i-f_i g_i(D)$ and so after a phase difference is computed, D can be computed via $$D=g^{-1}_i(\theta-\theta'_i)/f_i) \quad \text{Eq. 4}$$

However, the condition that the range of $|D|<1/(2f_i)$ restricts the usefulness of this approach. One technique to compensate for this limitation is to measure the phase of each tone and use the Chinese Remainder Theorem (CRT) to reconstruct what the actual signal delay is. The CRT provides an algorithm that can measure phase as if it were computed on a very low frequency signal (which would eliminate phase ambiguities) but has the precision the comes from computing phase on a high frequency signal. Mathematically, a resolution factor $f_r$ may be chosen based on how accurately phase can be measured. This could even be a propagation velocity factor such as c (the speed of light) and then time delay measurements become distance measurements, resulting in:

$$(\theta-\theta'_i)f_r/f_i=D \bmod(f_r/f_i) \quad \text{Eq. 5}$$

or by rounding to the nearest integer:

$$<(\theta-\theta'_i)f_r/f_i>=D \bmod(f_r/f_i) \quad \text{Eq. 6}$$

where each $f_i$ is a divisor of $f_r$. Provided that the integer values in the set $\{f_r/f_i\}$ are relatively prime (meaning no non-trivial integer factors in common), the CRT can take the integers $\{<(\theta_i-\theta'_i)f_r/f_i>\}$ and compute $D \bmod \Pi_i(f_r/f_i)$. Thus, the range of D is extended from a single period of a single frequency to a period which is the product of a number of frequencies, i.e., delay can be measured without ambiguity for all D in the range $|D|<0.5\Pi(f_r/f_i)$.

For completeness, we briefly describe the Chinese Remainder theorem (CRT). The CRT is an isomorphism (i.e., mapping) between the ring of integers modulo M, Z/MZ and the direct product of rings $\Pi$ $Z/m_i Z$ each with moduli $m_i$ where $\Pi m_i=M$, where M large enough to meet the dynamic range requirements of the computation. In some embodiments the mapping is as follows. Define $\hat{M}_i=\Pi_{j\neq i} m_j$ and set:

$$B_i=\hat{M}(\hat{M}^{-1} \bmod m_i) \bmod M \quad \text{Eq. 8}$$

Then it follows that:

$$\|a\|_M=\|\Sigma_i \alpha_i B_i\|_M \quad \text{Eq. 9}$$

where $\alpha_i=\|a\|m_i$ and $\|x\|_y$ denotes x modulo y.

In practice, the phase measurements involved in finding each value of the measurement set $\{(\theta_i-\tilde{\theta}_i)f_r/f_i\}$ may have errors from received noise (here $\tilde{\theta}_i'$ denotes the measured value of the phase of the delayed signal which includes measurement noise) and so when rounding to the nearest integer, there is a non-zero probability that the correct result could be off by 1 or more. In order to both do the phase estimate and measure the accuracy of this estimate, modulo mean and modulo variance may be computed, rather than standard mean and variance.

FIG. 1 is a flow diagram of an algorithm to determine modulo mean and variance for phase measurements, according to embodiments. Referring to FIG. 1, a low pass decimating filter 110 generates a complex sample 112 of outputs for which the complex phase, p, is between −0.5 and 0.5. Then for each sample, three parallel paths are taken by this complex phase p. Each path does a slightly different calculation and at the end the "best" result is chosen.

If, at operation 116, the phase p is less then zero then at operation 120, 1 is added to the phase p. If, at operation 118 the phase p is greater than zero then at operation 122, 1 is subtracted from the phase. In the middle path, the value of p is not changed before mean and variance computation.

At operations 130, 132, and 134 the respective phases are summed with the respective squares of the modified phases, and at operations 140, 142, and 144 the respective means and variances are computed. At operation 150 the mean and variance pair with the minimum variance is selected for reporting.

Figure 2:
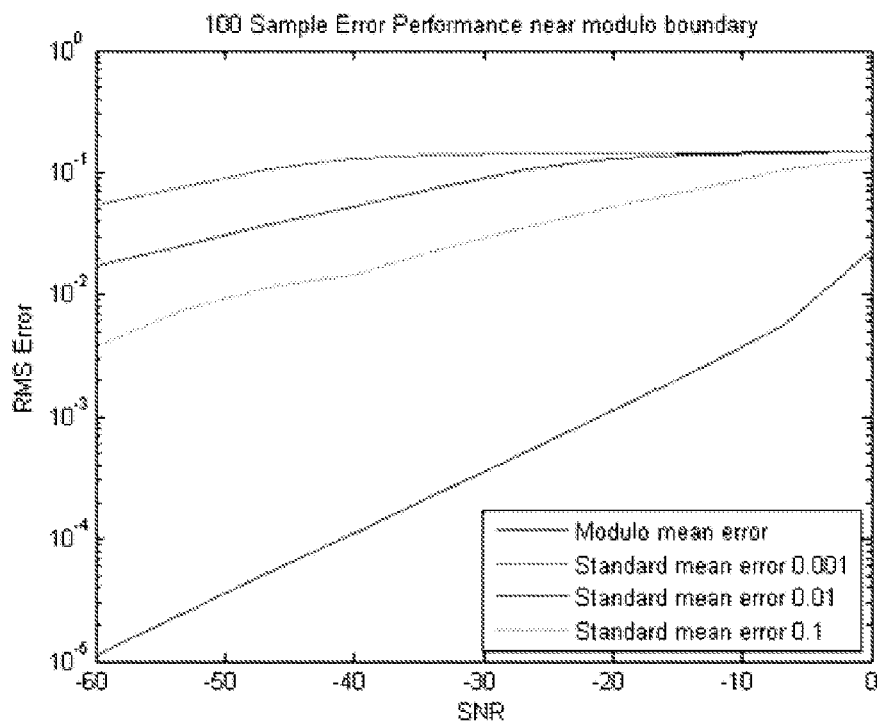
FIG. 2 is a graph illustrating performance variations between a modulo mean phase estimation technique and standard mean phase estimates, according to embodiments.

FIG. 2 is a graph illustrating performance variations between a modulo mean phase estimation technique and standard mean phase estimates, according to embodiments. More particularly, FIG. 2 illustrates the performance gains of the algorithm depicted in FIG. 1 against standard mean phase estimation techniques over a wide range of random (SNR) noise and against several different curves depicting data with phases near to the modulo boundary. In this case, standard mean phase estimation suffers from phase wrapping which causes large mean and variance estimation errors. This approach provides improvement in the mean estimate because it is better able to handle the problems caused by the modulo boundary.

Once the modulo mean and variance of the phase are determined, the probability that the integer phase estimate $<(\theta_i-\tilde{\theta}_i')f_r/f_i>=\tilde{D} \bmod (f_r/f_i)$ coming from the modulo mean of the phase difference is in error (off by 1 or more) can be estimated. This probability depends both on the modulo variance as well as the distance to the boundary of the round operation $$|(\theta_i-\tilde{\theta}_i')f_r/f_i-<(\theta_i-\tilde{\theta}_i')f_r/f_i>| \quad \text{Eq. 7}$$

For example, assuming a Gaussian phase error distribution with integer phase difference $\mu=<(\theta_i-\tilde{\theta}_i')f_r/f_i>$ and variance $\sigma^2$, this can be computed via:

$$p(u, \sigma^2) = \int_{\lceil\mu\rceil}^{\infty} \frac{1}{\sqrt{2\pi\sigma^2}} e^{-\frac{(x-\mu)^2}{2\sigma^2}} + \int_{-\infty}^{\lfloor\mu\rfloor} \frac{1}{\sqrt{2\pi\sigma^2}} e^{-\frac{(x-\mu)^2}{2\sigma^2}} \quad \text{Eq. 8}$$

Other error distributions can be accommodated similarly.

The probabilities may be sorted and, provided extra tones are utilized, a subset of the phases with lowest probabilities can be used to compute the estimated delay $\tilde{D}$. This allows elimination of the error caused by multipath and interference. In some embodiments, a set of tones may be selected such that $m_i=f_i/f_r$ are relatively prime and the subset $\{m_i\}_{i=1,2,...,u}$ determines the full range required with $\{m_i\}_{i=u+1,...,w}$ being redundant moduli for purposes of error detection and correction for both noise and multipath/interference. The modulo mean and variances of each phase may be estimated and integer phase differences and variances $\{\mu_i, \sigma_i\}$ may be computed for each modulus $m_i$. Next the set of phases $\{p(\mu_i, \sigma_i)\}$ may be sorted with order defined in the set J of indices.

Assume that the system operates at a multipath/interference design chosen with $\leq k$ such corrupted tones. Then for each l of the $$\binom{u+k}{u}$$

lowest subsets of J, evaluate $D_l$ using a Chinese Remainder Theorem (CRT). Here $$\binom{a}{b}$$

denotes the standard binomial coefficient. The most frequently occurring value of $\{D_l\}$ may be selected as the correct delay, and if no value occurs more than once, the value that uses the lowest u indices of J may be selected.

The above approach is more complicated than just using the modulo mean as is, but also offers better performance, especially under realistic conditions caused by multipath and/or interfering signals. Table 1 contains sample results showing the performance gains. Here σ controls the Gaussian noise in each phase measurement and we give the value where σ causes gross errors in the delay for a moduli set {7, 9, 11, 13, 17} with u=3. Note that the more moduli that are used, the greater range of σ can be supported because the error cliff grows with the number of moduli.

TABLE 1

Results of Error Recovery Algorithm

| Number of moduli | Error cliff for σ |
|---|---|
| 3 | 0.15 |
| 4 | 0.18 |
| 5 | 0.20 |

In some embodiments a Doppler/frequency offset estimate may also be generated. By way of example, a tracking filter may be applied to the delay output which would, over time, estimate a common Doppler and frequency offset. The offset may be common to all moduli channels since it is estimating an externally produced Doppler and/or frequency offset. This offset may be used to adjust both the center reference tones and possibly the filter widths.

Thus, described herein are methods for designing sets of tones (i.e., pure single frequency sine waves) which may be used to synchronize signals. The tones may be transmitted by a transmitter which may include logic to adapt the set of tones to changing environmental conditions based on detection of multipath and/or interference. Further, techniques may be implemented to automatically change frames of tones in order to accommodate changing conditions or to limit unauthorized usage. On the receiving end, a receiver may receive these tones and compute a phase of each tone.

Figure 3:
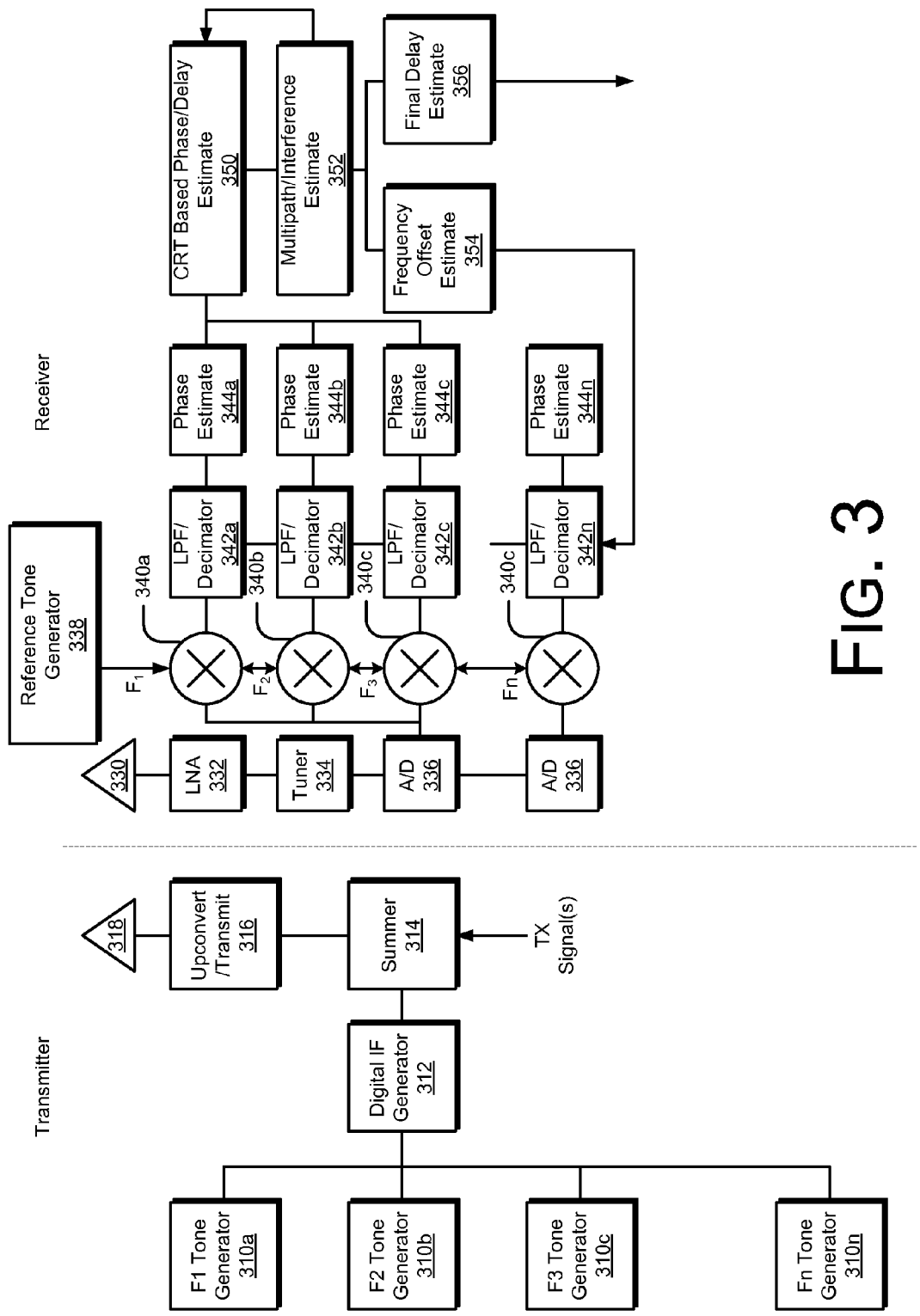
FIG. 3 is a schematic illustration of functional components of a communication system comprising a multitone transmitter and receiver, according to embodiments.

FIG. 3 is a schematic illustration of a communication system comprising a multitone transmitter and receiver, according to embodiments. Referring to FIG. 3, a transmitter module is shown on the left-hand side of the diagram and receiver module is shown on the right-hand side of the diagram. In some embodiments the transmitter module comprises a plurality of tone generators 310a, 310b, . . . 310n which produce a tone at respective frequencies F1, F2, . . . Fn. These tone generators may be referred to collectively herein by the reference numeral 310. One skilled in the art will recognize that the number, n, of tone generators 310 is, in theory, infinite. In practice the number of tone generators 310 may be a function of the bandwidth available for transmission.

Figure 4:
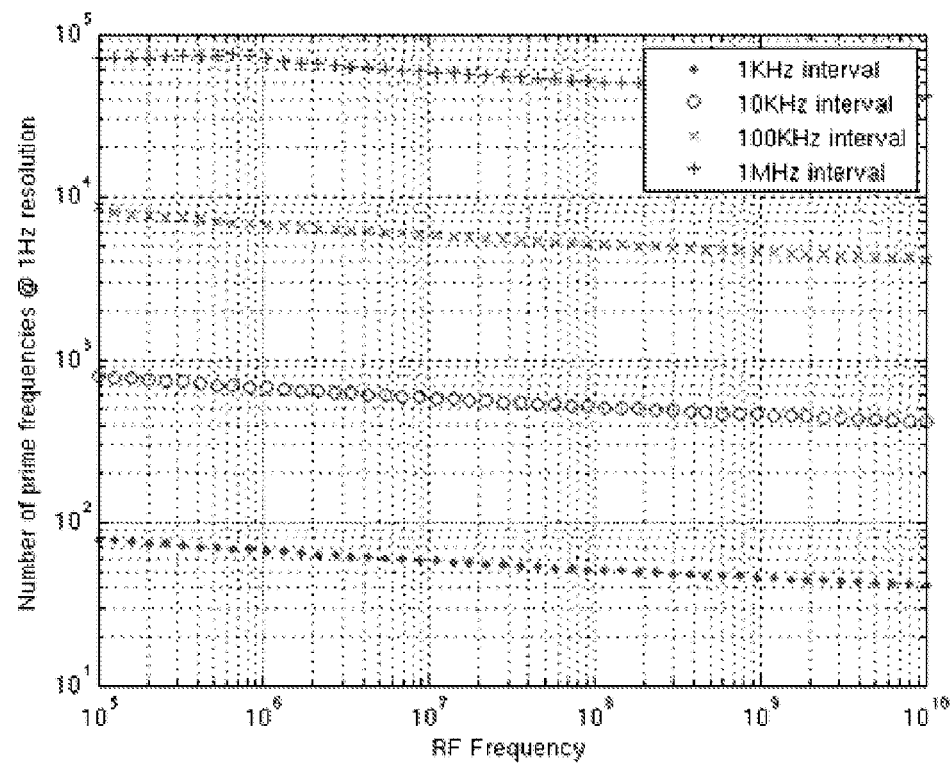
FIG. 4 is a graph which illustrates a number of choices for tone frequencies within four different bandwidths, according to embodiments.

Tone generators 310 generate a set of tone frequencies $f_{i, i=1,...,n}$ which should be relatively prime with respect to the frequency resolution $f_r$ chosen. In other words, $f_i/f_r$ should be relatively prime as integers. Even with this co-prime policy, there is a wide design space available. FIG. 4 below shows the asymptotic number of choices of frequencies within four different bandwidths when they are required to all be fully prime, a much stricter condition than just being relatively prime. The number of relatively prime choices is much greater.

In some embodiments, the procedure for generating tones may be implemented as follows. A system frequency resolution $f_r$, may be selected using various initial system parameters including signal to noise ratio (SNR), frequency range of operation R, maximum Doppler and maximum environmental change. A list of relatively prime integers F is initialized to be empty. Next, an integer $f \in R/f_r$ may be chosen such that $R/f_r$ is defined to be the set of integers $\{g | g=h/f_r, g \in Z, h \in R\}$. Integers in $R/f_r$ which have a greatest common divisor with f greater than 1 may be eliminated. The resulting integer f may then be added to the set F. The process may be repeated until a list of suitable length is generated. This process creates a growing list of integers which are relatively prime and the corresponding set $\{f_r F\}$ is then a set of actual frequencies contained within the operating frequency range R which can be used with the multi-tone synchronization algorithm described in this invention disclosure.

Tones generated by tone generators 310 are input into a digital IF generator 312, the output of which is directed to a summer 314, where it may be added to additional transmission signals. By way of example, the additional transmission signals may represent transmission content generated by other components of the transmitter. The output of the summer 314 is directed to an upconverter/transmitter module 316 to be upconverted to a transmission frequency and transmitted via antenna 318.

A signal transmitted by antenna 318 may be received by an antenna 330 in a receiver and directed to a low noise amplifier 332, a tuner 334, and an analog to digital (A/D) converter 336 to convert the analog signal to a digital signal. The digital signal output from the A/D converter is input into frequency mixers 340a, 340b, ..., 340n, which may be collectively referred to by reference numeral 340, where the respective outputs are mixed with a reference tone generated by a reference tone generator 338.

The output of the frequency mixers 340 are input to respective low-pass filters 342a, 342b, ..., 342n, where the signals are filtered and decimated then passed to respective phase estimators 344a, 344b, ..., 344n, referred to collectively by reference numerals 344.

If the propagation medium causes frequency dependent non-linear delays, the architecture in FIG. 3 allows for separate non-linear compensation on each frequency as described in Equation 4. Specifically the output of phase estimators 344a, 344b, ..., 344n are passed into the non-linear compensation 346a, 346b, ..., 346n for phase correction.

The respective corrected phase estimates are output to a CRT based phase/delay estimate module 350, which uses a CRT algorithm as described above to generate a phase/delay estimate for the respective signals. The phase delay estimate is input to a multipath/interference estimate module 352 which generates a multipath/interference estimate for the respective signals. In some embodiments the multipath interference estimate module 352 implements the algorithm as described above. The output of the multipath/interference estimate module 352 is input to a frequency offset estimate module 354, which generates a frequency offset estimate as described above that is fed back to the LPF/Decimator circuits 342 and to a final delay estimate module 356, which generates a final delay estimate using one of several possible frequency frame change algorithms to be described below.

In some embodiments the set of tones can remain constant, while in other embodiments the sets of tones may be adapted in response to changing conditions or can be changing randomly over time in order to handle unknown or untrackable conditions, or to decrease detectability by unauthorized users. Let $f_i(R)_{i=1,\ldots,N(R)}$ be the largest set of N(R) relatively prime frequencies with respect to $f_r$ within an operating frequency range R, which may be non-contiguous. This set may be determined at design time, as described above. A subset of length w of the frequencies may be chosen to accommodate the delay range and the signal-to-noise ratio (SNR), which determines phase error, and multipath/interference levels of the system under consideration. Each set of frequencies may be referred to as a frame. In the event that a non-constant operation is desired, new subsets of frequencies (i.e., new frames) may be chosen in a manner similar to frequency hopping radio designs. The receiver then may synchronize to the frame using knowledge of the sequence and an initial acquisition step which tries different frequency sets in sequence order until a match occurs.

Figure 5:
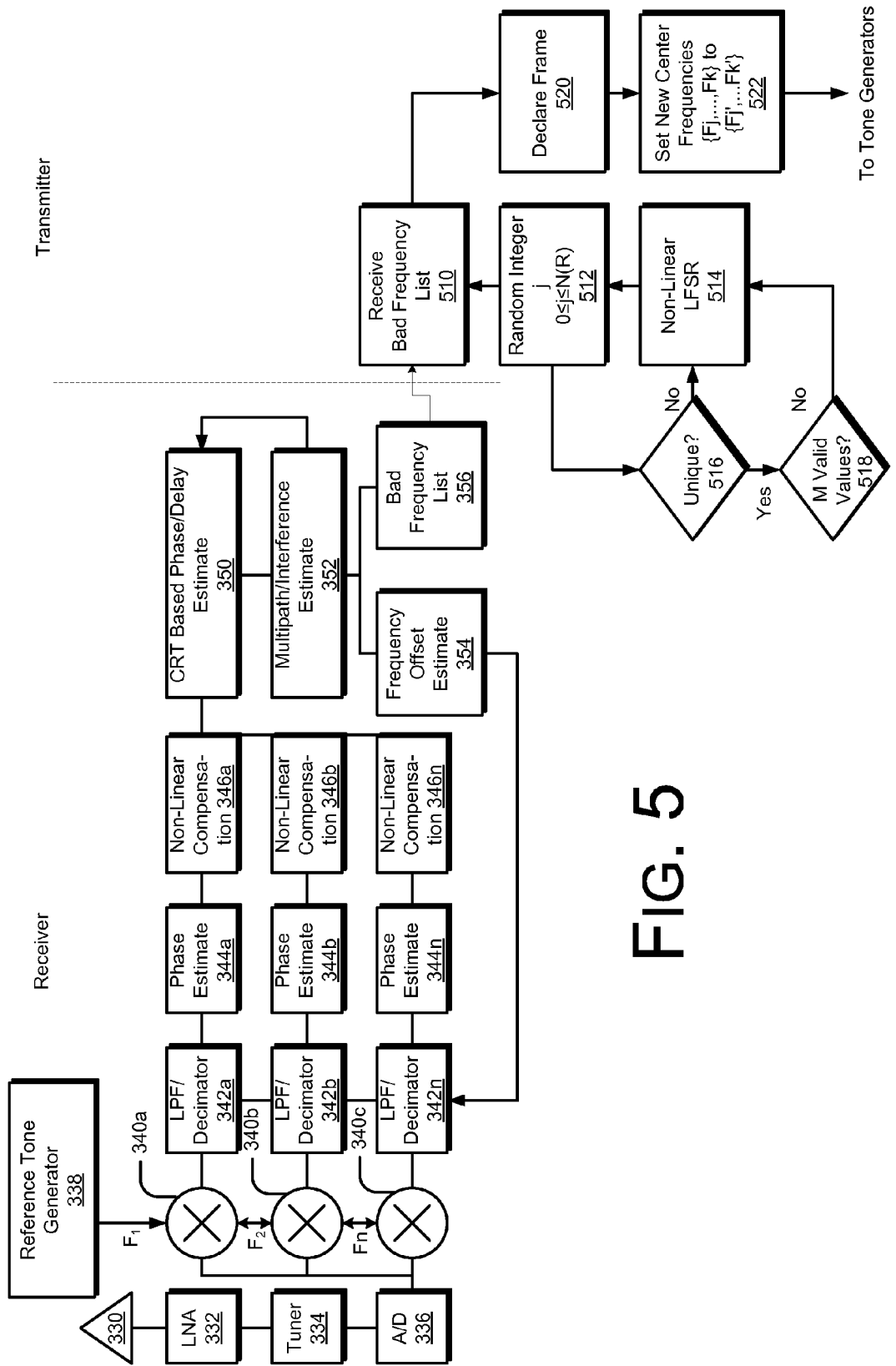
FIGS. 5-7 are schematic illustrations of functional components of a communication system which implements adaptation-based frequency frame change algorithms, according to embodiments.

The following describes three specific frequency frame change algorithms. A first algorithm is depicted in FIG. 5 where component 356 (i.e., the final delay estimate) from FIG. 3 is expanded, in which a multi-tone sync receiver is used as a monitor receiver. The components of the receiver may be substantially the same as the components of the receiver depicted in FIG. 3, described above. In some embodiments the receiver may report back to the transmitter a bad frequency list 356 of which tones were corrupt.

A synchronization module in the transmitter receives the bad frequency list and implements a series of operations to allow the transmitter to switch to new frequencies. A random integer j' is retrieved (operation 514) from a nonlinear shift register 512. In some embodiments the integer j' is selected from a set of integers between 0 and N(R). If, at operation 516, the integer j' is not unique then control passes back to operation 514 and a new integer j' is selected from the nonlinear shift register 514. By contrast, if at operation 516 the integer j' is unique then control passes to operation 518, where it is determined whether there are M valid values in the set of frequencies. At operation 520 the synch module declares a frame, and at operation 522 the synch module changes the bad center frequency set from $\{F_j, \ldots, F_k\}$ to a new set $\{F_{j'}, \ldots, F_{k'}\}$, which may be passed to the tone generators 310 depicted in FIG. 3. Each new set of frequencies may be sent to the transmitter with the tone generators.

Figure 6:
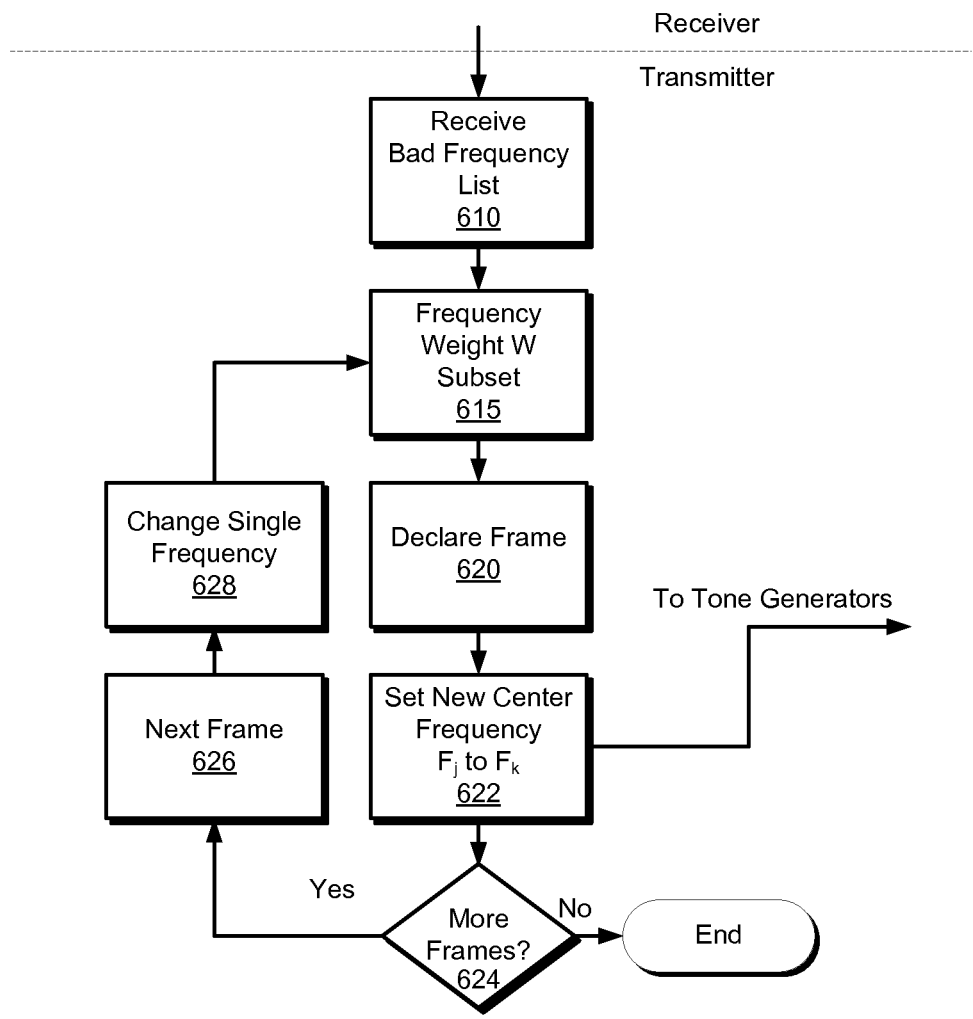

A second algorithm is depicted in FIG. 6. The algorithm depicted in FIG. 6 is similar to the algorithm depicted in FIG. 5 except that it implements a minimal change routine which steps through each set of w frequencies by changing only one frequency at a time per frame. Referring to FIG. 6, at operation 610 a synch module in the transmitter receives the bad frequency list from a receiver, as depicted in FIG. 5. At operation 615 a frequency weight (W) subset is selected. At operation 620 a frame is declared and at operation 622 a new center frequency for the declared frame is set. The new center frequency is sent to the tone generators 310.

If, at operation 624, there are more frames to process then control passes to operation 626 and the next frame is selected. At operation 628 a single frequency in the frame is selected and control then passes back to operation 615. Thus, operations 620-628 define a loop by which implements changes to the frequencies in a minimal change fashion.

Figure 7:
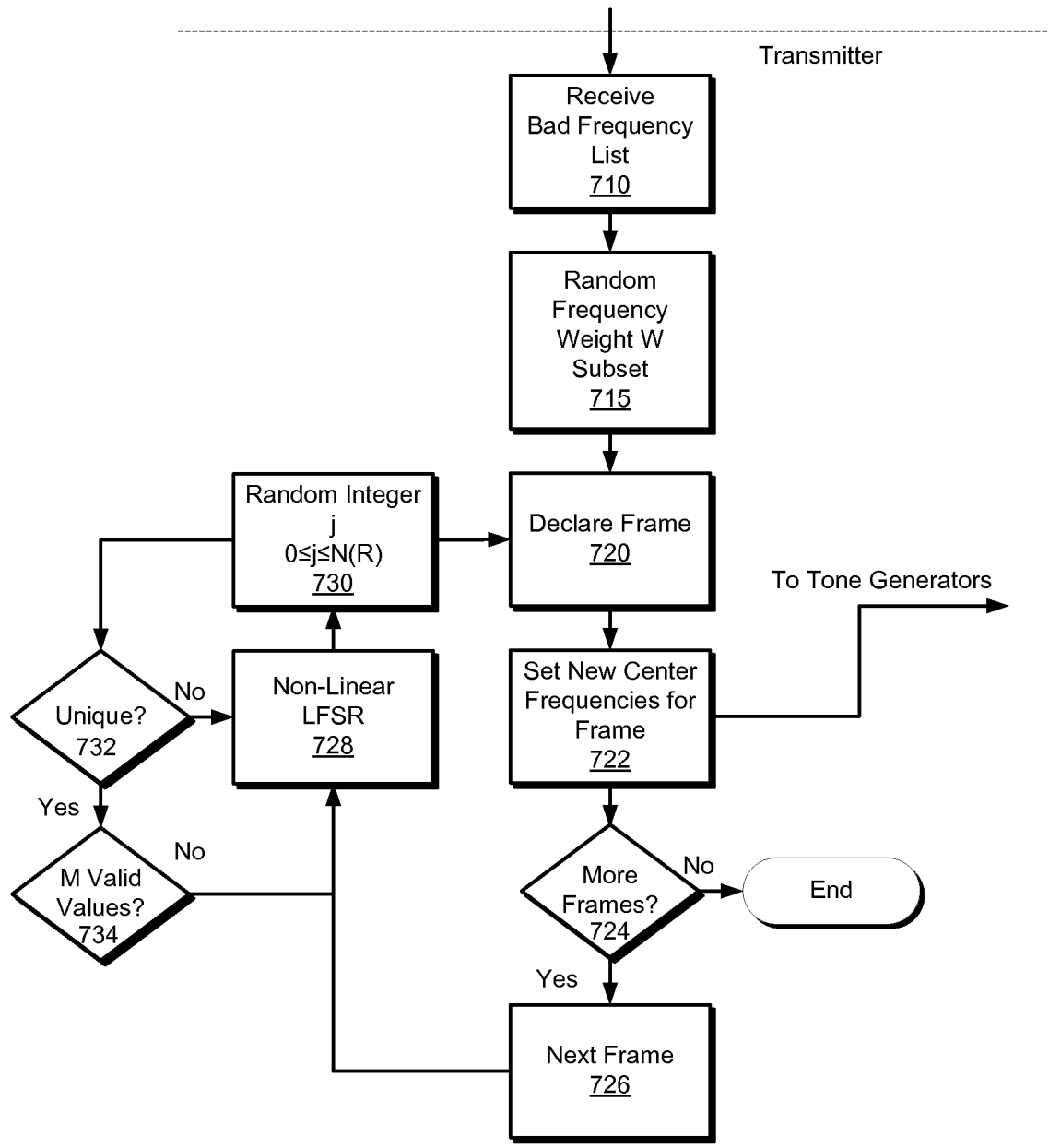

A third algorithm is depicted in FIG. 7. The algorithm depicted in FIG. 7 uses a pseudo random sequence which drives the frequency changes, instead of restricting to changing bad frequencies only. Unauthorized users would not know this sequence and so could not derive the tone sequence and hence synchronization without a great deal of effort. In this case, the changing frequencies are known by both transmitter and receiver through the mutual knowledge of the pseudo-random tone sequence and so no communication is required between the two when frequencies are changed.

Referring to FIG. 7, at operation 710 a synch module in the transmitter receives the bad frequency list from a receiver, as depicted in FIGS. 5 and 6. At operation 715 a random frequency weight (W) subset is selected. At operation 720 a frame is declared and at operation 722 a new center frequencies are set for the declared frame. The new center frequencies are sent to the tone generators 310.

If, at operation 724, there are more frames to process then control passes to operation 726 and the next frame is selected. A random integer j is retrieved (operation 730) from a nonlinear shift register 728. In some embodiments the integer j is selected from a set of integers between 0 and N(R). If, at operation 732, the integer j is not unique then control passes back to operation 728 and a new integer j is selected from the nonlinear shift register 730. By contrast, if at operation 732 the integer j is unique then control passes to operation 734, where it is determined whether there are M valid values in the set of frequencies.

Thus, the synchronization techniques described herein offer numerous advantages over conventional synchronization techniques. By way of example, the techniques described herein can be designed to avoid frequencies of known interfering emitters and to occupy arbitrary (non-contiguous) frequency ranges. Further, the synchronization techniques utilize a series of low pass decimating filters operating at a slow (output) rate, rather than a high speed correlation engine operating at the full chip rate, and do not require a search over code phase since there is no code to match with. Instead, every output of the narrow band decimating filters gives an estimate of delay. Still further, it does not have code Doppler impairment effects, since all tones are narrow band, and does not have the amplitude effects on the matched filter correlation method due to Doppler offsets. The only effect of Doppler or oscillator offsets is to shift all the frequencies by a fixed amount. It also has the natural ability to detect and correct impairments due to multipath.

Figure 8:
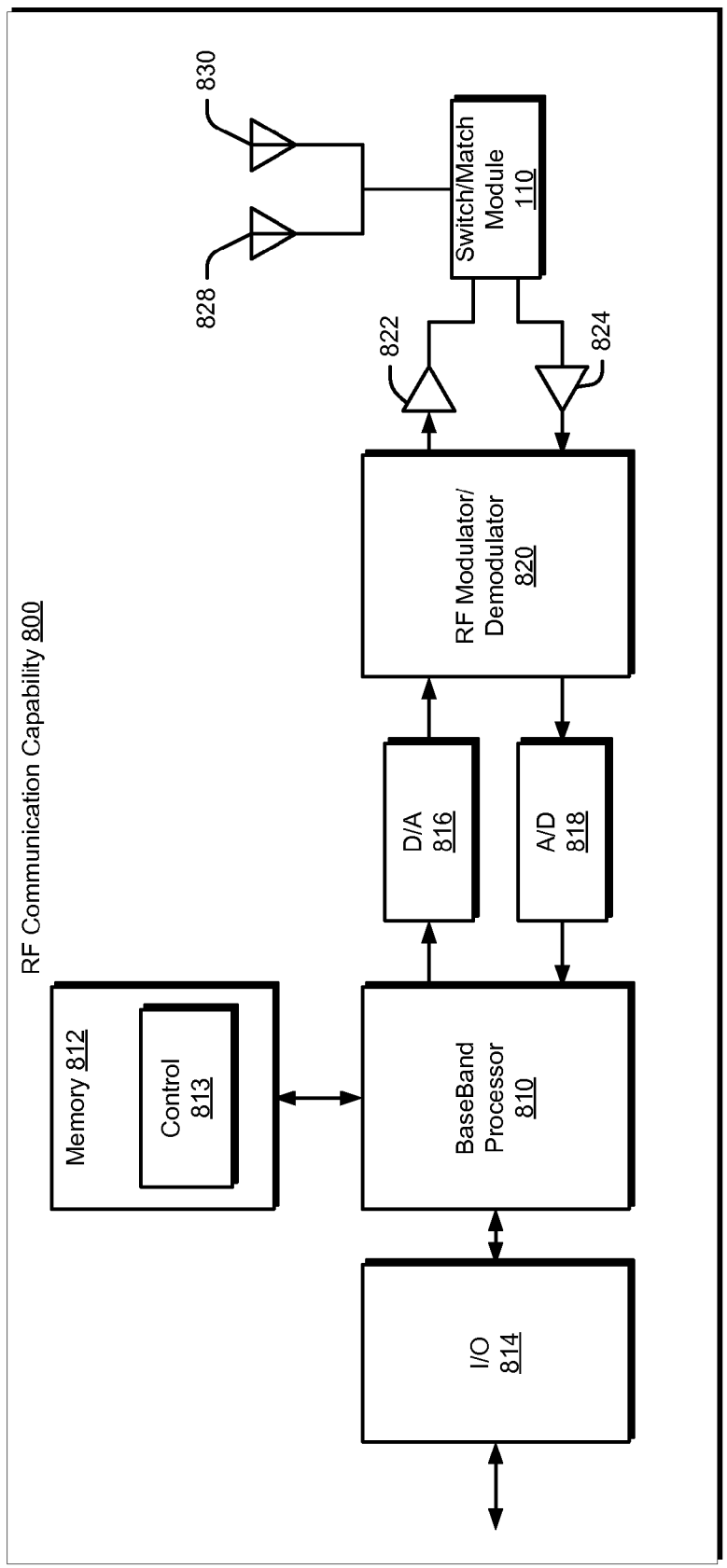
FIG. 8 is a schematic illustration of components of an RF communication capability, according to embodiments.

In some embodiments the synchronization module to implement the synchronization techniques described herein may be incorporated into the RF communication capability 800 of an electronic device, e.g. a transmitter and/or a receiver in a wireless network. Referring now to FIG. 8, a block diagram of an RF communication capability 800 in accordance with one or more embodiments will be discussed. FIG. 8 depicts the major elements of an RF communication capability 800, however fewer or additional elements may be included in alternative embodiments in addition to various other elements that are not shown herein, and the scope of the claimed subject matter is not limited in these respects.

RF communication capability 800 may comprise a baseband processor 810 coupled to memory 812 for performing the control functions of RF communication capability. Input/output (I/O) block 814 may comprise various circuits for coupling RF communication capability to one or more other devices or components of an electronic device. For example, I/O block 814 may include one or more Ethernet ports and/or one or more universal serial bus (USB) ports for coupling RF communication capability 800 to a modem or other devices. For wireless communication, RF communication capability 800 may further include a radio-frequency (RF) modulator/demodulator 820 for modulating signals to be transmitted and/or for demodulating signals received via a wireless communication link.

A digital-to-analog (D/A) converter 816 may convert digital signals from baseband processor 810 to analog signals for modulation and broadcasting by RF modulator/demodulator 820 via analog and/or digital RF transmission techniques. Likewise, analog-to-digital (A/D) converter 818 may convert analog signals received and demodulated by RF modulator/demodulator 820 digital signals in a format capable of being handled by baseband processor 810. Power amplifier (PA) 822 transmits outgoing signals via one or more antennas 828 and/or 830, and low noise amplifier (LNA) 824 receives one or more incoming signals via antennas 828 and/or 830, which may be coupled via a switching and matching module to control such bidirectional communication. In one or more embodiments, RF communication capability 800 may implement single input, single output (SISO) type communication, and in one or more alternative embodiments RF communication capability may implement multiple input, multiple output (MIMO) communications, although the scope of the claimed subject matter is not limited in these respects.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to generate a set of tone frequencies within an operating frequency range for use in a timing acquisition process in a wireless communication system, comprising:

selecting a system frequency resolution, $f_r$;

generating a set of frequency tones which are prime integers with respect to the frequency resolution $f_r$ and within an operating frequency range, R, of the wireless communication system, wherein generating a set of frequency tones which are relatively prime integers with respect to the frequency resolution $f_r$ and within an operating frequency range, R, of the wireless communication system comprises choosing a set of frequency tones for which the frequency tone divided by the frequency resolution has a greatest common divisor less than or equal to 1.

2. The method of claim 1, further comprising:

adapting the set of tones to changes in one or more environmental conditions in the transmission medium or to limit unauthorized usage of the wireless communication system.

3. The method of claim 2, wherein adapting the set of tones comprises:

selecting a first subset of frequency tones from the set of frequency tones; and transmitting the subset of frequency tones from the transmitter.

4. The method of claim 3, further comprising:

receiving at least two signals comprising the first subset of frequency tones; and computing a phase difference between the two signals.

5. The method of claim 3, further comprising:

receiving feedback from at least one receiver which indicates that one or more frequency tones in the first subset of frequency tones are corrupt; and in response thereto selecting a second subset of frequency tones, at least a portion of which are different than the first subset of frequency tones.

6. The method of claim 5, further comprising:

transmitting the second subset of frequency tones from the transmitter.

7. An apparatus to generate a set of tone frequencies within an operating frequency range for use in a timing acquisition process in a wireless communication system, comprising:

a processor; and a memory module comprising logic instructions which, when executed, configure the processor to:

select a system frequency resolution, $f_r$;

generate a set of frequency tones which are prime integers with respect to the frequency resolution $f_r$ and within an operating frequency range, R, of the wireless communication system; and choosing a set of frequency tones for which the frequency tone divided by the frequency resolution has a greatest common divisor less than or equal to 1.

8. The apparatus of claim 7, further comprising logic instructions which, when executed, configure the processor to:

adapt the set of tones to changes in one or more environmental conditions in the transmission medium or to limit unauthorized usage of the wireless communication system.

9. The apparatus of claim 8, further comprising logic instructions which, when executed, configure the processor to:
- select a first subset of frequency tones from the set of frequency tones; and
- transmit the subset of frequency tones from the transmitter.

10. The apparatus of claim 9, further comprising:
- a receiver to receive at least two signals comprising the first subset of frequency tones;
- a processor; and
- a memory module comprising logic instructions which, when executed, configure the processor to compute a phase difference between the two signals.

11. The apparatus of claim 9, further comprising logic instructions which, when executed, configure the processor to:
- receive feedback from at least one receiver which indicates that one or more frequency tones in the first subset of frequency tones are corrupt; and
- in response thereto, select a second subset of frequency tones, at least a portion of which are different than the first subset of frequency tones.

12. The apparatus of claim 11, further comprising logic instructions which, when executed, configure the processor to transmit the second subset of frequency tones from the transmitter.

* * * * *